April 12, 1966  A. M. MARKS ETAL  3,245,315
ELECTRO-OPTIC RESPONSIVE FLASHBLINDNESS CONTROLLING DEVICE
Filed Sept. 5, 1962  2 Sheets-Sheet 1

INVENTORS
ALVIN M. MARKS
BY MORTIMER M. MARKS
Albert F. Kronman
ATTORNEY

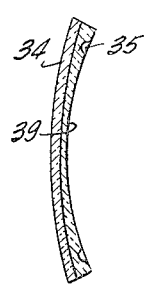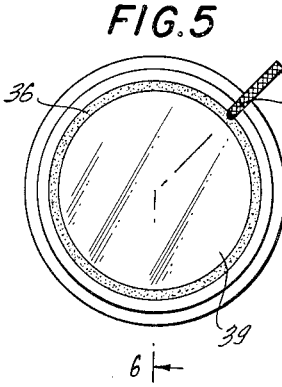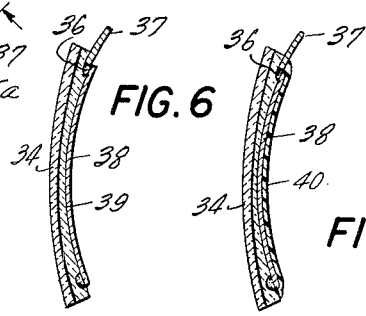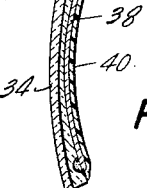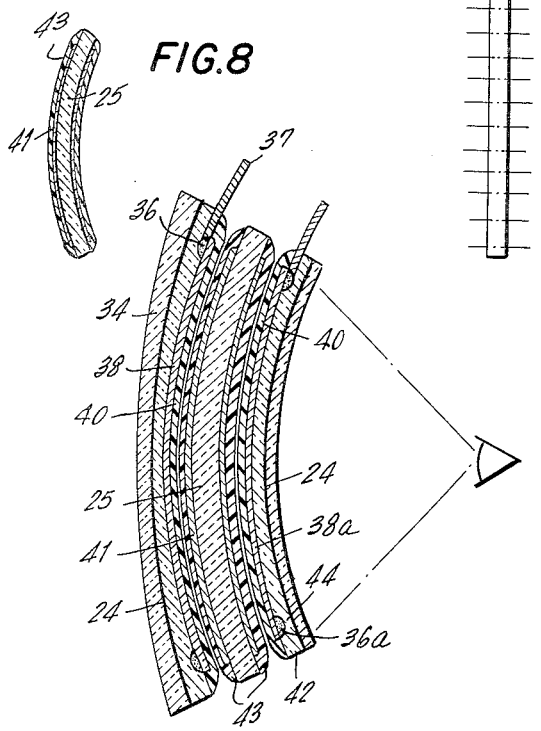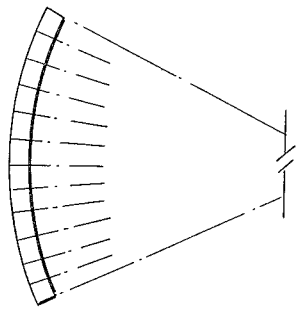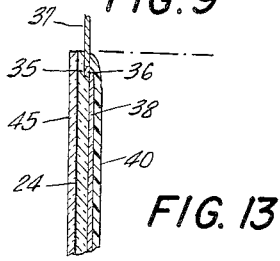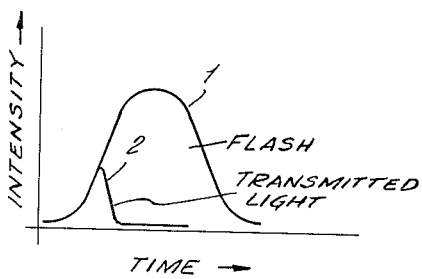

United States Patent Office
3,245,315
Patented Apr. 12, 1966

3,245,315
ELECTRO-OPTIC RESPONSIVE FLASHBLINDNESS CONTROLLING DEVICE
Alvin M. Marks and Mortimer M. Marks, both of 153—16 10th Ave., Whitestone, N.Y.
Filed Sept. 5, 1962, Ser. No. 221,474
8 Claims. (Cl. 88—61)

This invention relates to solid state devices and specifically such as are capable of controlling the passage of light through a partially transparent assembly of electro-optically responsive crystals and light polarizers in response to the application of an electrical charge, and is a continuation-in-part of an application for patent entitled Electro-Optic Apparatus and Method, filed Jan. 11, 1960, Ser. No. 1,782 now Patent No. 3,167,607 issued January 26, 1965.

Electro-optic shutters have been made using "Z" cut crystal plates of a thickness between .015 and .100" from uniaxial electro-optically active crystals, such as ammonium dihydrogen phosphate (ADP), potassium dihydrogen phosphate (KDP), potassium dihydrogen arsenate (KDA), potassium di-deuterium phosphate (KDDP), zinc sulphide and other similar materials. Upon the application of a suitable voltage between transparent electrodes attached to opposing "Z" cut crystal faces, which voltage varies with the nature of the crystal, a half wave retardation of the transmitted polarized light occurs. The plane of polarization of the light is thus rotated through 90°. With ADP crystals the application of 9600 volts along the "Z" axis produces a half wave retardation regardless of the crystal thickness. With KDP crystals approximately 7500 volts is required, and with KDA crystals only 6700 volts are needed to obtain a half wave retardation. With KDDP crystals one need apply only about 2500 volts to bring about the half wave retardation.

Crystals of the type hereinabove mentioned, however, are fragile and subject to destruction upon the application of high electrical potentials thereto. In addition, these crystals provide only a narrow angular field of view which is generally unsuitable for uses such as shutters, eyeglasses, and the like.

Assemblies formed of previously known "Z" cut electro-optically active crystals have been comparatively thick in cross-section and of necessity heavy in order to withstand stresses due to the high electric fields which have to be applied.

Gratings or grids were usually employed to quickly apply the electric charge to the surface of the crystal. Such elements, however, obstruct the optical transmission and introduce diffraction effects. Certain transparent electrical coatings used in the prior art devices have such a high resistance that the charge was applied to the surfaces of the crystal too slowly. Electro-optic shutters using these high resistance coatings have a slow response time.

To apply the charge to the crystal surface, a transparent conductive coating must be in direct contact with the crystal surface. The only hitherto available coatings have been evaporated metal coatings or oxide coatings such as stannic oxide, which have too low a transmittance, less than 70% per coating, or 50% per pair of coatings. This transmittance combined with 30% for a pair of parallel polarizers reduced the transmittance to 15% for a one crystal unit, 7½% for a 2 crystal unit, or only about 2% for a 4 crystal unit. These open transmittances are too low for most purposes. As an example of the present invention, transparent conductive coatings as hereinafter more fully set forth are used in direct contact with the crystal surface. These new transparent conductive coatings have no light absorbence, and hence a 4 crystal unit utilizing 3 polarizers has an open transmittance of 30%, and a closed transmittance of 0.1% to 0.01%.

Accordingly, it is an object of the present invention to provide an electro-optic device in the nature of a shutter or the like which will have a wide angular field of view.

A further object of the present invention is to provide an electro-optic device which will have a rapid response upon the application of an electrical charge.

Still another object of the present invention is to provide an electro-optic device which will have a high light transmittance.

A further object of the present invention is to provide an electro-optically active crystal in which the crystal axes converge toward a common point along the optical axis of the crystal.

An object of the present invention is to provide an electro-optic device having an operational reliability such that repeated application of the electric charge will not crack the crystal by setting up excessive internal stresses.

A feature of the present invention is the use of curved electro-optically active crystals.

Another feature of the present invention is the use of plano-meniscus lenses in combination with curved electro-optically active crystals to form a light controlling assembly.

Still another feature of the present invention is the use of novel conducting leads and films to distribute the charge over the electro-optically active crystal surface, evenly and quickly.

A further feature is the use of special laminating structures to provide a thin, light weight, rugged device.

The invention consists, of the construction, combination and arrangement of parts as herein illustrated, described and claimed.

In the accompanying drawings forming a part hereof are illustrated two forms of embodiment of the invention in which drawings similar reference characters designate corresponding parts, and in which:

FIG. 4 is a cross-sectional view of a laminated front plano-meniscus lens and polarize assembly used in the embodiment illustrated in FIG. 9.

FIG. 5 is a view in rear elevation of the lens shown in FIG. 4 illustrating the manner in which the conductive leads are applied to the front lens.

FIG. 6 is a view in vertical section taken on line 6—6 in FIG. 5 showing a transparent conductive coating applied to the concave surface of the lens and overlying the conducting ring therein.

FIG. 7 is a view in vertical section of the lens shown in FIG. 6 illustrating the application of a conductive coating and a lamination coating to the concave surface of the front lens.

FIG. 8 is a view in vertical section showing the electro-optically responsive crystal illustrated in the assembly shown in FIG. 9 and the application of transparent conductive coatings to both sides thereof, forming conductive surfaces of a size which will overlie the contact ring diameter and laminating coating on the lens elements.

FIG. 9 is a vertical section taken through a complete assembly of an electro-optic shutter made in accordance with the present invention a second embodiment.

FIG. 10 is a somewhat diagrammatic view showing an electro-optically responsive crystal made in accordance with the prior art.

FIG. 11 is a view similar to FIG. 1 showing the crystal after it has been bent for use in an electro-optic device in accordance with the teaching of the present invention.

FIG. 12 is a graph showing the response of an electro-optic shutter made in accordance with the present invention.

FIG. 13 is a fragmentary view similar to FIG. 1 showing a flat shutter.

Figure 1:
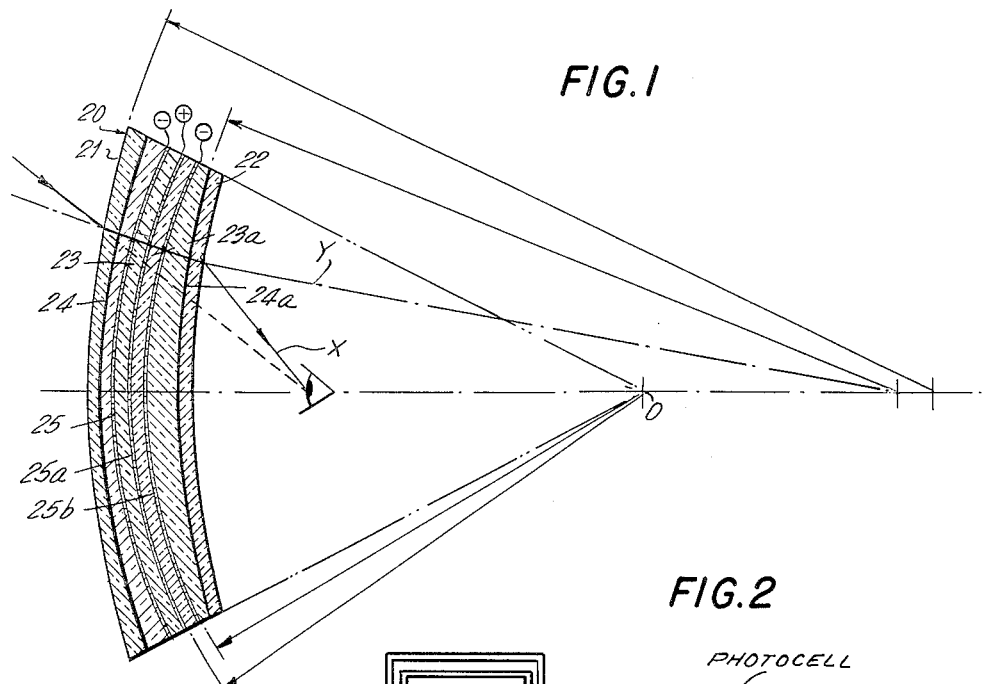
FIG. 1 is a cross-sectional view taken through an electro-optic shutter made in accordance with the present invention.

Referring to the drawings and specifically to FIG. 1, 20 indicates an electro-optic shutter lens assembly or the like having a laminated meniscus front lens 21 and a laminated meniscus rear lens 22. A sheet of a linear light polarizing material 24, 24a, is laminated between the elements of the front and rear lenses 21, 22. One or more "Z" cut electro-optically responsive crystals 23, 23a are laminated between the front and rear lenses 21, 22.

A first transparent conductive coating 25, hereinafter more fully described, is disposed on the face of the electro-optically responsive crystal 23. A second transparent conductive coating 25a is provided between the crystals 23, 23a. A third transparent conductive coating 25b is disposed upon the rear surface of the second crystal 23a, and completes the structure of the electro-optically responsive shutter 20.

Electrical potential is applied to the transparent conductive coatings 25, 25a, 25b, by means of suitable leads indicated by the plus and minus signs in FIG. 1. The transparent conductive coatings do not extend entirely to the edge of the crystals and a sufficient uncoated area is provided between the end of the coating and at the edge of the crystals to prevent spark breakdown between the coated layers.

It will be noted from an examination of FIG. 1, that the electro-optically responsive crystals 23, 23a, are curved in their cross-sectional configuration. These crystals 23, 23a, which may consist of ADP, KDP, zinc-sulphide, or similar materials, may also, and preferably be formed of potassium di-deuterium arsenate (KDDA), or potassium di-deuterium phosphate (KDDP). KDDP crystals, if used for this purpose, will be about four times more electro-optically active than the ADP crystals hereinabove referred to.

The electro-optically active crystals may be "Z" cut and then ground and polished to the curved form. However, despite the fragile nature of these crystals it has been found possible to take a "Z" cut flat, polished crystal and by the application of suitable pressure and temperature slowly curve the crystal into the form shown in FIG. 1, between spherical glass blocks (not shown).

Referring to FIG. 10 there is shown a flat electro-optically active crystal. Such crystals have an extremely small angle of view of only a few degrees due to the formation of an interference pattern, which changes upon the application of an electric field to produce a variation of light transmission. Such change is effective only within a small central angle about the optical "Z" axis of the crystal. However, by employing an electro-optic assembly using a bent crystal, such as is illustrated in FIG. 11, in the assembly illustrated in FIGURES 1 thru 9, a much wider angle of view can be obtained.

Employing a spherical or cylindrical curved crystal form, the optical axes of the crystals will converge to a point or a line generally indicated as "O" in FIG. 1. By means of the polarized meniscus lenses 21, 22, it is possible to achieve a wide angular aperture for a shorter distance of the eye from the lens, of the order of ¾ inch to 2½ inches depending on the curvature. With the curved electro-optically active crystal 23, 23a illustrated in FIG. 1 it is possible to achieve this shortening employing ordinary inexpensive crown glass lenses for the front and rear lenses 21 and 22. The lenses can produce an afocal system or may be formed with a predetermined prescription curvature suited to the specific requirements of a spectacle wearer.

Employing an assembly having a curved crystal such as is illustrated in FIG. 1 and with polarizers 24, 24a in parallel orientation there was observed a uniform aperture of about 28°, when the eye was placed within 4–5 inches from the crystal. A 28° aperture represents an increase of about 10 times over that possible with flat crystal plates. Simple plano-meniscus lenses can be used on each side of the assembly for this purpose. By employing positive and negative meniscus lenses 21, 22 an afocal system having a still shorter distance of the eye from the lens can be achieved as previously described, as shown by the refraction of the ray X away from the radius Y in FIG. 1. Upon the application of the characteristic voltage, hereinabove described, to the crystal surfaces the light was extinguished almost uniformly over the entire assembly.

A suitable transparent conductive coating for application to the crystals as described herein is:

(1) A high molecular weight polymer such as polyvinyl alcohol-acetate copolymer 10–50% by weight.

(2) A plasticizer capable of dissolving an ionizable salt, such as a glycol, for example; diethylene, or propylene glycol, or a polyhydric alcohol such as glycerin, 1-erythritol, or a polyglycol such as a bi, tri or tetra glycol: 25–60% by weight.

(3) The ionizable salts are preferably the alkali halides such as those of lithium, rubidium, cesium, potassium, etc. 5–50% by weight.

(4) A cross-linking agent such as silicagel, which also aids in the adhesion of the film to the crystal 50–0% by weight.

The salt is dissolved in the plasticizer at sufficient under saturation so that at no time is it possible for the mixture to crystalize at the lowest ambient temperature under which the film will be operating.

For example, a suitable ratio of salts to plasticizer in the case of lithium chloride and glycerin is one part of lithium chloride to four parts of glycerin.

Figure 2:
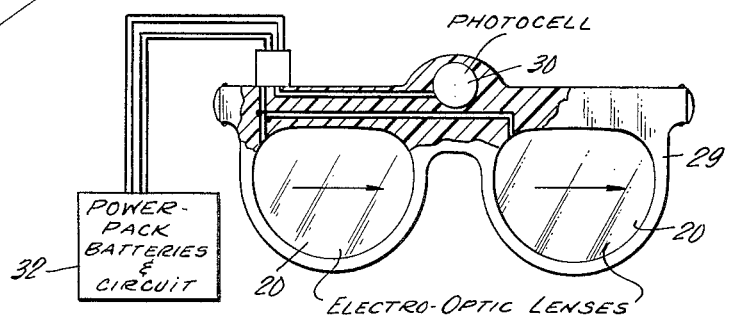
FIG. 2 is a view in front elevation showing eye protective spectacles employing the electro-optic devices of the present invention.
Figure 3:
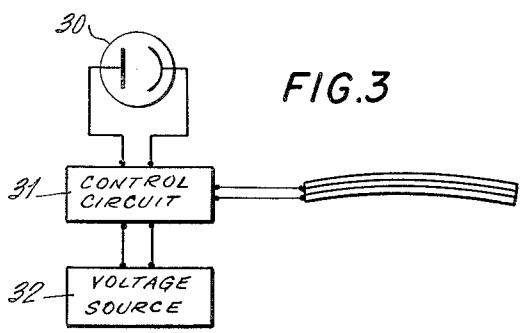
FIG. 3 is a somewhat diagrammatic view illustrating the manner in which the spectacles shown in FIG. 2 can be triggered by an excessively brilliant flash to protect the eye of the wearer.

Referring to FIGURES 2 and 3, there is shown the application of an electro-optically responsive assembly as herein described to eye-glasses or spectacles capable of protecting the eyes of a wearer from damage by a blinding flash of light. In this example two electro-optic shutters 20 are mounted within a frame 29 in the customary eye glass fashion. A photo-cell 30 may be carried above the bridge of the frame 29. The photo-cell 30 is connected to a control circuit generally indicated at 31 in FIG. 3. A voltage source 32 is connected to the control circuit and photocell 30 in the well known manner and provides the voltage necessary to operate the device.

When a flash of light of intensity greater than that which is safe for the eyes of the wearer reaches the photocell 30 the control circuit becomes activated and applies voltage from the voltage source 32 to the conductive coatings 25, 25a, 25b, of the electro-optic shutter. As a result, the shutter becomes darkened and prevents damaging light rays from traversing the lenses 20. The response time of this assembly is in the micro-second range and is sufficiently fast to protect the eyes of the wearer from flash blindness.

Referring to FIG. 12 there is shown a graph illustrating the response of an electro-optic shutter made in accordance with the present invention. Curve 1 of the graph represents the flash intensity vs. time. Curve 2 indicates the response of an electro-optic shutter. The curve shows the intensity of the light flash is quickly attenuated and the total flash energy reaching the eye is negligible and harmless. Upon termination of the flash which may last from 50 micro-seconds (xenon flash) to 15 milliseconds (flash bulb) or longer for electric arc, etc. the shutter becomes transparent. In the case of bright flashes of short duration the electro-optic lens will close and open so quickly that the wearer may be aware of only a weak flash of light without discomfort. The protection level can be adjusted so as to preserve the dark adaptation of the eyes.

The response time and general durability of the electro-optic shutter 20 illustrated in FIG. 1, can be greatly improved by the assembly shown in FIGS. 4–9. In this embodiment, the front lens 34 is provided with an annular groove 35 in the rear surface thereof. The groove 35 is spaced from the periphery of the lens 34 as shown in FIGS. 4 and 5. A suitable conductive material such as metal 36, is deposited in the groove 35 and forms a conductive path around the lens 34. One or more leads 37 are connected to the metal 36 in a groove 35a which extends radially toward the outer edge of the lens 34. The metal 36 provides a connection to a source of voltage (not shown).

A transparent conductive coating 38, similar to that hereinabove described, is deposited upon the inner surface 39 of the lens 34 and over the metal 36 in the groove 35. An open area not coated with transparent conductive coating is left around the edge of the lens 34 to provide a long nonconducting path at the periphery to prevent leakage or sparking between surfaces at different potentials. In this manner voltage applied to the leads 37 is led across the transparent coating 38 from its entire periphery resulting in a very quick response and there is a very even application of voltage to the structure. The transparent conductive coating 38 is relatively thick being of the order of .005 inch.

A laminating resin 40 is next disposed over the transparent conductive coating 38.

The "Z" cut curved electro-optically responsive crystal 25 shown in FIG. 9 has deposited thereon a thin conductive transparent coating of a thickness of .0005 inch. This coating 41 overlies the face of the crystal 25 and is in turn covered by a layer of a suitable laminating resin 43. The rear face of the crystal 25 is covered by another thin layer of transparent conductive coating material of .0005 inch thickness which in turn is covered by a layer of the laminating resin 43. The rear lens 42 which is a plano-meniscus lens is structurally the same as the front lens 34 of the assembly. The rear lens is provided with an annular groove 44 on its interior surface on which there is deposited metal 36a. A relatively thick transparent conductive coating 38a is disposed over the inner face of the lens 42 and in contact with the metal 36 in the groove 44. A peripheral uncoated area is also left on the rear lens 42. A coating of laminating resin 40 is placed over the transparent conductive coating 38a. All the laminating resin coatings extend to the edges. A layer of a linear light polarizing material 24 is laminated between the elements of the front plano-meniscus lens. A second layer of a linear light polarizing material 24a is laminated between the elements of the rear plano-meniscus lens. The entire assembly is then laminated under gentle pressure using a suitable laminating oil, as taught in U.S. Patent No. 2,632,725, issued March 24, 1953.

Rapid electrical charging of the electrical surface is produced by capacitative charge transfer and electrical leakage. The structure shown in FIGURE 9 operates as follows:

The peripheral metal ring 36 and the relatively thick transparent conductive coating 38 is charged within a microsecond or less. This rapid charging is due to the high conductivity of the ring 36 in contact with the transparent conductive coating 38, which is of such thickness and resistivity that the resistance per square is of the order of 10,000 ohms or less.

This charging may be accomplished with the transparent conductive coating above described having a thickness of the order of .005 inch. Such coatings are readily applied to the surface of glass such as the inner surfaces of lenses 34 and 42. However, the surface of the crystal 25 is much more delicate and a single thin coating of a composition similar to that above noted may be applied in a film of only about .0005 inch.

The thin transparent conductive coating 41 on the crystal, and the thick transparent conductive coating 38 on the lens are covered with a thin coating transparent laminating film to permit the lamination as described in the abovementioned Patent No. 2,632,725.

As described, the laminating coatings are fused together to form a thin insulating film between the thin transparent conductive coating and the crystal, and the thick transparent conductive coating on the glass.

When the electric voltage is applied to the conducting ring 36, the charge rapidly transfers through the low resistance thick coating on the glass to form a uniformly electrically charged transparent conductive surface. The same phenomena occurs on the ring electrode 36a and thick transparent coating, but with the opposite charge.

Now referring to the thin transparent conducting films on the crystal, these are not directly connected electrically to the external circuit. However, these transparent conductive films are in direct contact with the crystal surface and have an appreciable thickness of their own. As a result of the electric field which is rapidly applied between the thick transparent conducting films, a charge separation occurs within each of the thin transparent conducting films, and an electrical field is thus internally applied across the crystal 25 causing the electro-optic effect to occur.

In the case of an A.C. field, the electric charges within the thin transparent conducting films, and upon the faces of the crystal, oscillate. However, in the case of longer duration or D.C. pulses, leakage currents flow. The interface laminating coatings which ordinarily may be considered insulating films, are in actuality large areas, of 2 square inches or more, coated with a coating of the order of .001 inch thick, which provides a relatively low resistance path for electrical leakage across the insulating film.

The proximity of the transparent conducting films, which contain electrolytes, on both sides of the thin laminating film, causes ionic penetration, which further decreases resistance of the lamination film.

The above assembly has been found to provide the advantages of capacitative and low resistance path requisite for rapid electro-optical response, together with ease of fabrication, assembly and lamination necessary for the practical production of this device.

FIGURE 13 illustrates the application of the principles and structures hereinabove described, to a flat electro-optic shutter. The annular groove 35 in the flat lens or cover glass 45 is filled with conductive materials 36 to form a continuous electrically conductive path therearound. One or more leads 37 are connected to the metal 36 in the groove 35 for the application of electrical potential. A transparent conductive coating 38 overlies the inner face of the lens or cover glass 45 and the metal 36 but ends short of the periphery of the cover glass 45.

The laminating resin layer 40 is disposed over the conductive layer 38 to enable a flat electro-optically responsive crystal (not shown) to be secured to the cover glass 45. Except for using flat elements instead of curved the remainder of the structure illustrated in FIG. 13 is the same as that shown and described in connection with FIG. 9.

Having thus fully described the invention, what is claimed as new and desired to be secured by Letters Patent of the United States is:

1. An electrically responsive light controlling device comprising a laminated meniscus front lens, a first layer of a light polarizing material in said laminated front lens, an annular groove on the inner surface of the front lens and spaced from the periphery thereof, a quantity of electrically conductive material in said groove, at least one curved electro-optically responsive crystal upon and rearwardly disposed with respect to the front lens, a first transparent electrically conductive coating between the front lens and the crystal overlying the crystal face and in electrical contact with the conductive material in the groove, a laminated meniscus rear lens rearwardly disposed with respect to the crystal, a second layer of a light polarizing material in said laminated rear lens, an annular groove on the inner surface of the rear lens and spaced from the periphery thereof, a quantity of electrically conductive material in said rear lens groove, a second transparent electrically conductive coating between the crystal and rear lens overlying the crystal face and in electrical contact with the conductive material in the rear lens groove, adhesive means to secure the front lens, rear lens, polarizing material and conductive coating together and means including the conductive material in each of the grooves to apply electrical potential to each of the conductive coatings whereby light entering the device is modulated in its passage therethrough.

2. An electrically responsive device according to claim 1, in which the transparent conductive coatings are spaced from the periphery of the crystal.

3. An electrically responsive light controlling device comprising a curved front lens, an annular groove in the rear surface of the front lens and spaced from the periphery thereof, a quantity of an electrically conductive material in the groove to form a continuous conductive path therearound, at least one lead connected to the material in the groove, a transparent electrically conductive coating upon the rear surface of the front lens, spaced from the periphery of the lens and in contact with the material in the groove, a "Z" cut curved electro-optically responsive crystal upon the front lens, a first electrically conductive transparent coating on the front surface of the crystal, a second electrically conductive transparent coating on the rear surface of the crystal, a curved rear lens, an annular groove in the front surface of the rear lens and spaced from the periphery thereof, an electrically conductive material in the groove to form a continuous conductive path therearound, at least one lead connected to the material in the rear lens groove, a transparent electrically conductive coating upon the front surface of the rear lens spaced from the periphery of the lens and in contact with the material in the groove, a layer of light polarizing material upon the front and rear surfaces of the crystal, adhesive means to laminate the lenses, polarizing material and crystal together and means including the conductive material in each of the grooves and the conductive coatings to apply electrical potential to the crystals, whereby light entering the device is modulated in its passage therethrough.

4. An electrically responsive device according to claim 3, in which the electrically conductive coatings on the front and rear lenses are of the order of .005 inch thick and the electrically conductive coatings on the crystal are of the order of .0005 inch thick.

5. An electrically responsive device according to claim 3, in which the front and rear lenses comprise laminated plano meniscus lenses having a layer of a linear light polarizing material therein.

6. An electrically responsive device according to claim 3, in which the electro-optically responsive crystal is formed of potassium di-deuterium phosphate.

7. An electrically responsive light controlling device comprising a light transmitting front support, a continuous groove in the rear face of said support spaced from the periphery thereof, a quantity of electrically conductive material in said groove, at least one electro-optically responsive crystal adjacent the front support, a first transparent electrically conductive coating between the front support and the crystal overlying the crystal face and in electrical contact with the conductive material in the groove, a light transmitting rear support, a continuous groove on the inner surface of the rear support and spaced from the periphery thereof, a quantity of electrically conductive material in said rear support groove, a second transparent electrically conductive coating between the crystal and rear support overlying the crystal face and in electrical contact with the conductive material in the rear support groove, a layer of light polarizing material upon the front and rear surfaces of the crystal, adhesive means to secure the front support, rear support polarizing material and crystal together and means to apply electrical potential to the conductive material in each of the grooves.

8. A device according to claim 7 in which the transparent electrically conductive coatings do not extend beyond the conductive material in the grooves and are spaced from the periphery of the supports.

References Cited by the Examiner

UNITED STATES PATENTS

| 2,370,697 | 3/1945 | Tillyer | 88—65 |
| 2,403,730 | 7/1946 | MacNeille | 88—1 |
| 2,493,200 | 1/1950 | Land | 88—61 |
| 2,808,351 | 10/1957 | Colbert et al. | 117—211 |
| 2,876,393 | 3/1959 | Tally et al. | 317—101 |
| 2,926,293 | 2/1960 | Camm et al. | 88—61 |
| 2,997,521 | 8/1961 | Dahlgren | 174—68.5 |
| 3,124,623 | 3/1964 | Slawson | 264—1 |
| 3,152,215 | 10/1964 | Barstow et al. | 88—61 |
| 3,160,736 | 12/1964 | Catterson | 219—219 |
| 3,167,607 | 1/1965 | Marks et al. | 88—61 |

OTHER REFERENCES

American Institute of Physics Handbook, D. E. Gray, ed (first edition), pages 6–94 to 6–97, McGraw-Hill, New York, 1957.

Culver et al.: "Protective Glasses Against Atomic Flash" in Visual Problems in Aviation Medicine, ed. by A. Mercier, Pergamon Press, Oxford, published Sept. 14, 1962, pages 34 to 38.

Jenkins et al.: "Optical Transmission Measurements of an Anti-Flash System," USNRDL–TR–445, United States Navy Radiological Defense Laboratory, copy received in the Scientific Library Nov. 14, 1960, pages 1 to 6 relied on.

JEWELL H. PEDERSEN, *Primary Examiner.*